United States Patent [19]

Rendleman, Jr.

[11] Patent Number: 4,867,884
[45] Date of Patent: Sep. 19, 1989

[54] SEPARATION OF CYCLODEXTRINS BY AFFINITY CHROMATOGRAPHY

[75] Inventor: Jacob A. Rendleman, Jr., Metamora, Ill.

[73] Assignee: The United States of America as represented by the Secretary of Agriculture, Washington, D.C.

[21] Appl. No.: 315,239

[22] Filed: Feb. 10, 1989

Related U.S. Application Data

[63] Continuation of Ser. No. 159,990, Feb. 24, 1988, abandoned.

[51] Int. Cl.$^4$ .............................................. B01D 15/08
[52] U.S. Cl. ..................................... 210/635; 210/656; 502/404; 536/46; 536/103; 536/127
[58] Field of Search ......................... 536/46, 103, 127; 210/635, 656, 198.2, 502.1; 502/404

[56] References Cited

U.S. PATENT DOCUMENTS

| | | | |
|---|---|---|---|
| 3,960,720 | 6/1976 | Porath | 210/635 |
| 4,303,787 | 12/1981 | Horikoshi | 536/103 |
| 4,330,440 | 5/1982 | Ayers | 210/635 |
| 4,418,144 | 11/1983 | Okada | 536/103 |
| 4,421,650 | 12/1983 | Nagasawa | 210/635 |
| 4,431,544 | 2/1984 | Atkinson | 210/635 |
| 4,781,977 | 11/1988 | Yagi | 536/103 |

OTHER PUBLICATIONS

Hackh's Chemical Dictionary, Fourth Edition, McGraw-Hill Book Co., New York, 1972, p. 436.
Pedro Cuatrecasas, "Protein Purification by Affinity Chromatography", J. Biol. Chem., 245 (12): 3059–3065, Jun. 25, 1970.
Bender et al., "Reactivity and Structure Concepts in Organic Chemistry," vol. 6, In Cyclodextrin Chemistry, Klaus Hafner Springer-Verlag, New York, pp. cover-27 (1978).
Hampel, "The Encyclopedia of Chemistry," Third Edition, Van Nostrand and Reinhold Company, New York, 1974, p. 695.

Primary Examiner—Ernest G. Therkorn
Attorney, Agent, or Firm—M. Howard Silverstein; John D. Fado; Curtis P. Ribando

[57] ABSTRACT

Mixtures containing cyclodextrins are fractionated by affinity chromatography on matrices bearing hydrophobic ligands. The size and structure of the hydrophobic ligands can be altered to change the relative affinity of the ligands for different cyclodextrins and thus influence chromatographic fractionation.

3 Claims, No Drawings

SEPARATION OF CYCLODEXTRINS BY AFFINITY CHROMATOGRAPHY

This applications is a continuation of application Ser. No. 07/159,990, filed 2/24/88, now abandoned.

BACKGROUND OF THE INVENTION

1. Field of the Invention

The cyclodextrins (CD's), also known as cycloamyloses and Schardinger dextrins, are a series of cyclic oligosaccharides produced by the action on starch of cyclodextrin glycosyl transferases obtained from several known microorganisms. CD's are composed of six or more D-glucopyranose units in the C1 chair conformation connected by alpha-(1,4) linkages to form a torus, or doughnut-shaped polymer [Bender et al., *Cyclodextrin Chemistry*, Springer-Verlag, New York (1978)]. Each homolog is designated by a Greek letter indicating the number of monomer units in the compound. The alpha-, beta-, and gamma-CD's, which contain, respectively, 6, 7, and 8 D-glucose units, preponderate over any higher molecular weight CD's that might form during enzymatic digestion of starch.

In recent years, especially in Europe and Japan, there has been increased interest in CD's, because of the utility and scope of their complexation reactions. In particular, the pharmaceutical, cosmetic, toiletry, food, and agrochemical industries have directed attention to these compounds. A continuing problem is the need for effective methodology for separating, on a preparative scale, CD mixtures or mixtures of products formed through derivatization of CD's. This invention relates to an easy, practical, economical means for fractionating CD's and separating them from the bulk of complex reaction mixtures.

2. Description of the Prior Art

The separation of mixtures of alpha-, beta-, and gamma-CD's, especially those mixtures of CD's contained in crude starch digests, has often been accomplished by selective precipitation by appropriate organic compounds such as tetrachloroethylene, tetrachloroethane, p-cumene, cyclohexane, fluorobenzene, and anthracene [Cramer et al., Chem. Ber. 91(2): 308–310 (1958); Freudenberg et al., Ann. 518: 102–108 (1935); French et al., JACS 71(1): 353–356 (1949)]. Separations by partition chromatography on cellulose columns with ternary solvents for development [Lammers, Starke 19(3): 70–73 (1967)], high-temperature cellulose column chromatography [French et al., Arch. Biochem. Biophys. 111(1): 153–160 (1965)], gel-permeation chromatography on crosslinked dextran [Zsadon et al., Starke 30(8): 276–279 (1978); Carter et al., Anal. Biochem. 39(2): 521–527 (1971)], and adsorption chromatography on charcoal with gradient elution (butanol-water) [Lammers, J. Chromatog. 41(3–4): 462–466 (1969)], have all been at least moderately effective. Thin-layer [Wiedenhof, J. Chromatog. 15(1): 100–102 (1964)], circular paper [Cramer et al. Ann. 595(2): 81–100 (1955)], and high-performance liquid [M. Szilasi et al., In First International Symposium on Cyclodextrins, J. Szejtli (ed.), D. Reidel Publishing Co., Boston, 1982, pp. 61–68; B. Zsadon et al., J. Chromatog. 172: 490–492 (1979)] chromatography have been applied as analytical tools. However, there have been no reported applications of affinity chromatography for analyzing or separating mixtures of CD's.

SUMMARY OF THE INVENTION

I have now discovered that mixtures of CD's and CD derivatives can be readily separated and fractionated by means of affinity chromatography on matrices bearing hydrophobic ligands. The size and structure of the hydrophobic ligands can be altered to change the relative affinity of the ligands for different CD's and thus influence chromatographic fractionation.

In accordance with this discovery, it is an object of the invention to apply affinity chromatography for the first time to the separation of CD's.

It is also an object of the invention to "tailor make" the chromatographic matrix according to the kind of separation desired by varying the size and structure of the nonpolar (hydrophobic) ligand attached to the matrix.

A further object of the invention is to simplify various separations and fractionations by employing only water as eluent.

Other objects and advantages of this invention will become readily apparent from the ensuing description.

DETAILED DESCRIPTION OF THE INVENTION

It is theorized that the torus configuration of CD's provides a hydrophobic cavity, enabling CD's to behave as hosts in forming inclusion compounds (clathrates) with a wide variety of organic and inorganic substances (guests), such as hydrocarbons, chlorinated hydrocarbons, aliphatic and aromatic acids, drugs, dyes, fragrances flavor compounds, ionic detergents, and certain small inorganic acids [Bender et al., supra; Szejtli, Proceedings of the First International Symposium on Cyclodextrins, D. Reidel, Boston (1982)]. Although host-guest interactions are mainly of the Van der Waals type, dipole-dipole and hydrogen bonding forces can also contribute, depending upon the nature of the guest. This invention utilizes the ability of CD's to complex with nonpolar molecules and applies that ability for the first time to affinity chromatography of CD's on matrix-containing immobilized nonpolar ligands (alkyl and aryl groups). In such matrix systems, the major factors determining bond strength and, therefore, retentivity, are the size and shape of the guest molecule (ligand) and the size of the nonpolar, conical cavity of the CD host.

Separations or fractionations performed by this invention employ a column that is packed with a matrix bearing hydrophobic ligands, and the sample to be fractionated is eluted through the column with a solvent. The hydrophobic ligands form complexes with the CD's in the sample. The different CD's, because of differing strengths of hydrophobic interactions, are eluted through the column at different rates.

The matrices contemplated by this invention must be appropriate for use as a support for immobilized ligands. Beaded agarose is suitable for this purpose, but it is anticipated that other matrices, such as crosslinked dextran and polyacrylamide, can also be used. The matrix is activated by means of a reagent which will insert reactive groups along its length. A preferred derivatized agarose is prepared by the method of Cuatrecasas [J. Biol. Chem. 245(12): 3059–3065 (1970)]. This method involves activation of agarose by reaction with cyanogen bromide (BrCN) followed by reaction with an aryl or alkyl amine compound containing the desired ligand.

Selection of appropriate hydrophobic ligands to be attached to the activated matrix support will of course be dependent upon the composition of the cyclodextrin mixture to be separated as well as the desired elution sequence and rates of elution. In general, ligands which are most closely clathrated, that is, fit most tightly into the cavity of a CD host, will have the greatest retentivity for that species of CD. While the molecular diameter of linear alkyl groups would theoretically allow them to fit easily into any of the CD's, it is speculated from the comparatively high retentivities observed for these ligands that they assume a conformation within the CD cavity which allows for a secure fit. The tightness of this fit and affinity for clathration are of course dependent upon the chain length as well as the size of the CD cavity. The molecular dimension of aryl ligands is such that the ligands readily fit into the cavities of beta-CD's, but are too large for alpha-CD's and too small to make a secure fit in the cavities of gamma- and delta-CD's.

Another factor affecting retentivity relates to the spacing between the matrix and the portion of the ligand which interacts with the cavity of the CD. The portion of the ligand between the matrix and the interactive region is called the spacer. Generally, the longer the spacer, the less is the steric hindrance between the matrix and the CD, and the greater is the retentivity. Spacers may be alkyl chains or ring structures. The minimum length for an alkyl ligand, to include both the interactive region and the spacer, is considered to be the equivalent of about 5 carbons, and that for an aryl ligand would be a methyl phenyl.

Using the agarose-derivatization procedure described above, aryl ligands of increasing length are provided by reaction of the matrix with the following series of amine compounds: 2-phenylethylamine, 4-phenylbutylamine, 4-phenoxyaniline, and phenylundecylamine. In this series, the phenyl group determines the order of elution of CD's, and the length of ligand influences elution volume. Because of the strong affinity between the phenyl group and beta-CD, this CD is the last one eluted from columns having immobilized phenyl groups. The order of increasing elution volume obtained with these ligands is alpha, gamma, beta. Alkyl ligands provide an elution order different from that obtained with aryl ligands, namely, gamma, beta, alpha. For both types of ligands, increasing the length of ligand increases the elution volume of the CD's.

The degree of substition of the ligand on the matrix can be controlled by appropriate selection of the amount of activation reagent. When both an excess of activating reagent and ligand are employed in the reaction, it is presumed that the degree of substitution approximates the maximum achievable. By selecting levels of reagent concentration that lead to less than maximum degree of substitution, affinities of the resultant complex to specific CD's can be tailored for efficaceous retention times.

The actual molar concentration of ligand per milliliter of gel cannot be precisely determined because of the absence at this time of a reliable assay. However, the nitrogen content of the derivatized gels (given in the Table below) serves as an index of ligand content. Since agarose derivatives of this type are generally believed to be mainly isoureas [Parikh et al., Chem. Eng. News 63(34): 17-32 (1985)], one can assume that there are two nitrogen atoms for each ligand molecule. This assumption is the basis of the values given in the Table for mmoles of ligand per milliliter of wet gel. These values indicate that approximately one-fourth of the available hydroxyl groups in agarose are converted to isourea groups during derivatization.

While the advantages of this discovery are maximized by the use of water as the sole eluent, it is envisioned that other solvent systems such as gradient elution or binary mixtures could be used to alter retentivities and influence elution rate of CD's. Another alternative would be to introduce solutes that would complex with the CD's in competition with the immobilized ligands.

The amount of solvent required to elute a particular CD will of course depend on the size of the column and the type of immobilized ligand. The amount of solvent needed to obtain the peak elution of a particular compound is referred to as the "elution volume" or "retention volume." And accordingly, the "elution time" or "retention time" represents the duration between initial solvent additioon and the peak elution of the compound. The retention time is a function of both the elution volume and the flow rate. By way of illustration, a flow rate of about 30 ml/hr is satisfactory for the separation and fractionation of CD's on derivatized agarose columns that are 2.5 cm in diameter and in the range of 10–30 cm in height.

Because of the unique interactions between CD's and hydrophobic ligands, this invention provides very effective separations of CD's from substances that do not bind with these ligands. For example, simple sugars such as glucose and acyclic carbohydrate polymers such as maltodextrins, which are frequently present in reaction mixtures with CD's, are completely separated from CD's because of their low affinity for the ligands. Also, cyclodextrins that are chemically derivatized to the extent that they are unable to clathrate with the ligands are separable from the underivatized cyclodextrins. As discussed above, the elution rates of various CD's can be influenced by altering the size and structure of the ligand attached to the column matrix. In fact, the order in which CD's are eluted can be changed in this manner. Moreover, the applicability of this technique to relatively large samples renders it useful for both preparative and commercial fractionation.

The following examples are intended only to further illustrate the invention and are not intended to limit the scope of the invention which is defined by the claims.

EXAMPLE 1

Preparation of Activated Agarose. Into an 800-ml beaker equipped with magnetic stirring bar, thermometer, and pH electrode, was introduced a mixture of 170 ml of washed agarose (sold under the trade name "Bio-Gel A-0.5m Gel," 200–400 mesh beads, Bio-Rad Laboratories) and 170 ml of water. With rapid stirring, 51 g (0.48 mole) of cyanogen bromide (BrCN) was added all at once. After 3 min, during which time most of the BrCN dissolved, the temperature of the slurry was adjusted to 20.0° C. A moderately rapid dropwise addition of 10M sodium hydroxide (NaOH) then followed. When the pH reached 11, the rate of addition of NaOH was reduced sufficiently to maintain a pH of 11.0–11.3. Crushed ice was added to the reaction mixture to maintain the temperature within the range of 19°–20.1° C. The end point, which occurred after about 15 min, was taken to be that stage where one drop of NaOH was sufficient to maintain the desired pH for 30 sec. Total volume of 10M NaOH required was about 74 ml. At this time, sufficient crushed ice was added to lower the temperature to 0° C. The cold slurry was filtered by suction in a 600-ml funnel with coarse fritted-glass disc and immediately washed over the course of 1.5–2.0 min with four 300-ml portions of cold (3°–5° C.) 0.1M sodium borate buffer of pH 9.3.

EXAMPLE 2

Preparation and Use of 4-Phenylbutyl-agarose. Immediately after preparation by the method of Example 1, 170 ml of activated agarose was mixed rapidly at 3°–5° C. with a mixture of 51 g (0.34 mole) of phenylbutylamine (98%) and 50 ml of 0.1M sodium borate buffer of pH 9.3. The resulting mixture was stirred at this temperature overnight (18 hr) and filtered with suction in a coarse fritted-glass funnel (600-ml capacity) at room temperature (25° C). It was then washed repeatedly with water (total of 2 L), followed by 0.2M acetate buffer of pH 4 (2 L) and finally more water (6 L). The characteristics of the resulting 4-phenylbutyl-agarose are reported in the Table.

A glass chromatographic column (2.5×70 cm) was packed to a height of 27 cm with the 4-phenylbutyl-agarose, and a mixture of D-glucose, alpha-CD, beta-CD, and gamma-CD was eluted through the column with water at the rate of 30 ml/hr. The effluent was monitored by a phenol-sulfuric acid method [Dubois et al., Anal. Chem. 28(3): 350–356 (1956)]. The results in the Table show that glucose passed through the column quickly, followed closely by the alpha- and gamma-CD's, with some overlapping of their peaks. In contrast, the beta-CD eluted more slowly and was completely separated from the other components of the mixture.

EXAMPLE 3

4-Phenoxyphenyl-agarose. Immediately after preparation by the method of Example 1, 80 ml of activated agarose was mixed rapidly at 3°–5° C. with the following amine mixture: 29 g (0.15 mole) of 4-phenoxyaniline (97%) dissolved in 50 ml of tetrahydrofuran (THF) and then mixed with 50 ml of 0.1M sodium borate buffer of pH 9.3. The resulting slurry was stirred overnight (18 hr) at 3°–5° C. and filtered with suction in a 600-ml coarse fritted-glass funnel at room temperature (25° C.). It was then washed six times without suction with 500-ml portions of 1:1 (v/v) THF-water, followed by 2 L of water in 500-ml portions. At this point the pH of the wash liquid was 7.7. The gel was then transferred to a beaker, mixed with 500 ml of water, and treated with 0.15M hydrochloric acid (HCl) to lower the pH to a stable 4.0. The mixture was again filtered in the fritted-glass funnel and finally washed without suction with a total of 3 L of water. The characteristics of the resulting 4-phenoxyphenyl-agarose are reported in the Table.

The chromatogrpahic procedure of Example 2 was repeated with a mixture of alpha-, beta-, and gamma-CD's on a 13-cm column of 4-phenoxyphenyl-agarose. The results in the Table are similar to those obtained with 4-phenylbutyl-agarose except that the phenoxyphenyl ligand gave complete separation of the alpha- and gamma-CD's.

EXAMPLE 4

2-Phenylethyl-agarose was prepared from 2-phenylethylamine by the procedure described in Example 2 using the same molar proportions of reactants. The characteristics of the resulting 2-phenylethyl-agarose are reported in the Table. The chromatographic procedure of Example 3 was repeated using a column of 2-phenylethyl-agarose. The results in the Table show that the effect of the short spacer arm of this ligand was to decrease the elution volumes of the CD's, with very limited separation of the alpha- and gamma-CD's.

EXAMPLE 5

Phenylundecyl-agarose. Immediately after preparation by the method of Example 1, 73 ml of activated agarose was treated at 3°–5° C. with a mixture of 31.8 g (0.129 mole) of phenylundecylamine, 50 ml of THF, nd 50 ml of 0.1M sodium borate buffer of pH 9.3. An addition 50 ml of THF was added to the slurry which was then stirred at 3°–5° C. overnight and filtered with suction in a 600-ml coarse fritted-glass funnel at 25° C. Washing was done with 1 L of water followed by 1.5 L of 0.1M acetate buffer of pH 4 without suction and finally again with water (4 L with suction and 6 L without suction). The characteristics of the resulting phenylundecyl-agarose are reported in the Table.

The chromatographic procedure of Example 3 was repeated using a column of phenylundecyl-agarose. The results in the Table indicate that there was strong clathration of the CD's with the phenylundecyl-agarose, resulting in extremely large elution volumes.

EXAMPLE 6

Octyl-agarose. Immediately after preparation by the method of Example 1, 170 ml of activated agarose was mixed rapidly at 3°–5° C. with a mixture of 45 g (0.34 mole) of octylamine (97%), 50 ml of 0.1M sodium borate buffer of pH 9.3, and 50 ml of THF. The mixture was stirred at this temperature for 2 hr, filtered with suction in a 600-ml coarse fritted-glass funnel at room temperature (25°), and then washed three times with 200-ml portions of 1:1 (v/v) THF-water, suction being applied each time. Washing was continued with 600 ml of 0.1M acetate buffer of pH 4 applied with suction. Additional buffer (1 L) was applied without suction. A final washing with water was made first with suction (1 L of water) and then without suction (5 L). The characteristics of the resulting octyl-agarose are reported in the Table.

The chromatographic procedure of Example 2 was repeated with a mixture of alpha-, beta,- and gamma-CD's on a column of octyl-agarose at a flow rate of 38 ml/hr. The results in the Table show that octyl-agarose completely separated the three CD's, though the elution volumes were moderately large. This matrix provided an elution order different from that obtained with those having immobilized phenyl groups.

EXAMPLE 7

The chromatographic procedure of Example 6 was repeated with a mixture of gamma-CD and maltodextrin mixture M150 (Grain Processing Corp.). This mixture had an average degree of polymerization (DP) of 7.4 with 52% of the oligomers having DP greater than 10). The results in the Table show the separation of gamma-CD from the other components, which all had the same elution volume.

EXAMPLE 8

Dodecyl-agarose. Immediately after preparation by the method of Example 2, 170 ml of activated agarose was mixed rapidly at 3°–5° C. with a mixture of 63 g (0.33 mole) of dodecylamine (98%), 126 ml of 0.1M sodium borate buffer of pH 9.3, and 126 ml of THF. Two liquid layers resulted. After additional cold THF (50 ml) was added, the mixture was stirred overnight (18 hr) at 3°–5° C. Filtration and washing were the same as that in Example 6 except that 7 L of pH 4 acetate buffer was added and the final wash was with 16 L of water. The characteristics of the resulting dodecyl-agarose are reported in the Table.

The chromatographic procedure of Example 2 was repeated with a mixture of alpha-, beta-, and gamma-CD's on a column of dodecyl-agarose. The results in the Table show that separation of the CD's was very poor and elution volumes were extremely large.

EXAMPLE 9

The chromatographic procedure of Example 8 was repeated with a mixture of D-glucose and maltodextrin mixture M150 at a flow rate of 11 ml/hr. The results in the Table show that D-glucose and the maltodextrins are separated widely from the CD's.

EXAMPLES 10–12

Dodecyl-agarose of Very Low Ligand Concentration. Activated agarose was prepared by the method of Example 1 except that 1.03 g (0.0094 mole) of BrCN was added slowly to the agarose-water mixture over a period of 5–10 min, and the pH was adjusted with 1M NaOH. To the activated agarose was added, at 3° C., a mixture of 2.64 g (0.014 mole) of dodecylamine (98%), 126 ml of THF, and 126 ml of 0.1M sodium borate buffer of pH 9.3. An additional 50 ml of THF was added, and the resulting mixture was stirred for 24 hr at 3° C. After filtration as in Example 8, washing of the derivatized gel was accomplished first with 800 ml of 1:1 (v/v) THF-water, then with 1500 ml of 0.1M sodium acetate buffer of pH 4, and finally with 6 L of water. The characteristics of the resulting low-ligand dodecyl-agarose are reported in the Table.

The chromatographic procedure of Example 2 was repeated on a column of low-ligand dodecyl-agarose at a flow rate of 15 ml/hr with a mixture of alpha-, beta-, and gamma-CD's; with D-glucose alone; and with maltodextrin mixture M150. The data in the Table show that the lower concentration of ligand resulted in smaller elution volumes of the CD's and separation was improved greatly. D-glucose and the maltodextrin mixture were completely separated from the CD's.

EXAMPLES 13–15

Untreated Agarose. The chromatographic procedure of Example 2 was repeated on a column of untreated agarose (see characteristics in the Table) with a mixture of alpha-, beta-, and gamma-CD's (flow rate, 10 ml/hr); with D-glucose alone (flow rate, 15 ml/hr); and with maltodextrin mixture M150 (flow rate, 15 ml/hr). All these substances had essentially the same elution volumes, i.e., no separations occurred.

EXAMPLES 16–18

Activated, Underivatized Agarose. Immediately after preparation by the method of Example 1, 85 ml of activated agarose was mixed rapidly with 100 ml of 0.1M sodium borate buffer of pH 9.3 in the absence of any amino compounds. The resulting mixture was stirred at this temperature overnight, then filtered with suction in a coarse fritted-glass funnel at room temperature, and washed rapidly with water (total of 3 L) followed by 0.2M acetate buffer of pH 4 (2 L) and finally more water (8 L). The characteristics of the resulting activated, underivatized agarose are reported in the Table.

The chromatographic procedure of Example 3 was repeated on a column of activated, underivatized agarose with a mixture of alpha-, beta-, and gamma-CD's; with D-glucose alone; and with maltodextrin mixture M150. As in Examples 13–15, essentially no separations occurred.

It is understood that the foregoing detailed description is given merely by way of illustration and that modification and variations may be made therein without departing from the spirit and scope of the invention.

TABLE

| Example | Matrix | mMoles N per ml of wet gel | mMoles ligand per ml of wet gel | Component of mixture | Amount of component (mg) | Column height (cm) | Elution volume (ml) | Note[1] |
| --- | --- | --- | --- | --- | --- | --- | --- | --- |
| 2 | 4-Phenylbutyl-agarose | 0.373 | 0.187 | D-glucose | 4 | 27 | 120 | a |
|   |   |   |   | alpha-CD | 4 |   | 170 |   |
|   |   |   |   | beta-CD | 4 |   | 890 |   |
|   |   |   |   | gamma-CD | 4 |   | 210 |   |
| 3 | 4-Phenoxyphenyl-agarose | 0.430 | 0.215 | alpha-CD | 2 | 13 | 70 |   |
|   |   |   |   | beta-CD | 4 |   | 410 |   |
|   |   |   |   | gamma-CD | 2 |   | 120 |   |
| 4 | 2-Phenylethyl-agarose | 0.358 | 0.179 | alpha-CD | 1 | 13 | 75 | b |
|   |   |   |   | beta-CD | 2 |   | 125 |   |
|   |   |   |   | gamma-CD | 1 |   | 70 |   |
| 5 | Phenylundecyl-agarose | 0.410 | 0.205 | alpha-CD | 4 | 13 | 1970 | c |
|   |   |   |   | beta-CD | 24 |   | 7390 |   |
|   |   |   |   | gamma-CD | 16 |   | 3480 |   |
| 6 | Octyl-agarose | 0.341 | 0.171 | alpha-CD | 12 | 27 | 1980 |   |
|   |   |   |   | beta-CD | 8 |   | 1240 |   |
|   |   |   |   | gamma-CD | 4 |   | 310 |   |
| 7 | Octyl-agarose | 0.341 | 0.171 | maltodextrins | 40 | 27 | 130 | d |
|   |   |   |   | gamma-CD | 4 |   | 310 |   |
| 8 | Dodecyl-agarose | 0.324 | 0.162 | alpha-CD | 24 | 27 | 7740 | e |
|   |   |   |   | beta-CD | 16 |   | 7740 |   |
|   |   |   |   | gamma-CD | 8 |   | 5880 |   |
| 9 | Dodecyl-agarose | 0.324 | 0.162 | D-glucose | 1 | 27 | 119 |   |
|   |   |   |   | maltodextrins | 2 |   | 119 |   |
| 10 | Low-dodecyl-agarose | 0.027 | 0.014 | alpha-CD | 24 | 27 | 5300 | f |
|   |   |   |   | beta-CD | 16 |   | 3900 |   |
|   |   |   |   | gamma-CD | 8 |   | 1250 |   |
| 11 | Low-dodecyl-agarose | 0.027 | 0.014 | D-glucose | 4 | 27 | 127 |   |
| 12 | Low-dodecyl-agarose | 0.027 | 0.014 | maltodextrins | 4 | 27 | 136 |   |

TABLE-continued

| Example | Matrix | mMoles N per ml of wet gel | mMoles ligand per ml of wet gel | Component of mixture | Amount of component (mg) | Column height (cm) | Elution volume (ml) | Note[1] |
|---|---|---|---|---|---|---|---|---|
| 13 | Untreated agarose | $4 \times 10^{-7}$ | — | alpha-CD | 0.33 | 27 | 127 | |
| | | | | beta-CD | 0.33 | | 127 | |
| | | | | gamma-CD | 0.33 | | 127 | |
| 14 | Untreated agarose | $4 \times 10^{-7}$ | — | D-glucose | 1 | 27 | 111 | |
| 15 | Untreated agarose | $4 \times 10^{-7}$ | — | maltodextrins | 1 | 27 | 124 | |
| 16 | Activated, underivatized agarose | 0.365 | — | alpha-CD | 0.8 | 13 | 67 | |
| | | | | beta-CD | 0.8 | | 67 | |
| | | | | gamma-CD | 0.8 | | 67 | |
| 17 | Activated, underivatized agarose | 0.365 | — | D-glucose | 1 | 13 | 62 | |
| 18 | Activated, underivatized agarose | 0.365 | — | maltodextrins | 1 | 13 | 62 | |

[1] Separation of components may be considered 100% unless specifically noted. Incomplete separations are indicated as % of baseline; i.e., the distance from the bottom of the trough between two peaks to the top of the shorter of the two peaks expressed as % of the distance from the baseline to the top of the shorter of the two peaks. Identical elution volumes indicate no separation.

[a] D-glucose and alpha-CD were separated 88% of the baseline; the alpha- and gamma-CD's were seperated 86%.
[b] The alpha- and gamma-CD's were separated 7% of baseline.
[c] The alpha- and gamma-CD's were separated 93% of baseline; beta- and gamma-CD's were separated 86%.
[d] The separation of gamma-CD and the maltodextrins was 95% of baseline.
[e] The separation of gamma-CD and the other CD's was 12% of baseline.
[f] The alpha- and beta-CD's were separated 66% of baseline.

I claim:

1. A method for separating compounds in a mixture which comprises a first compound and at least one second compound, wherein said first compound is a cyclodextrin which has an affinity towards clathration with nonpolar ligands and said at least one second compound is selected from the group consisting of cyclodextrins other than said first compound, chemical derivatives of cyclodextrins, simple sugars, acrylic carbohydrate polymers, and other compounds that have little or no tendency to complex with nonpolar ligands, with the proviso that at least one of said second compounds is a cyclodextrin other than said first compound, the method comprising:

a. introducing said mixture to the bed of a matrix chromatographic column wherein said matrix bears immobilized nonpolar ligands selected from the group consisting of alkyl groups having a chain length of about 5 to 12 carbon atoms, phenyl alkyl groups having an alkyl chain length of 1 to 11 carbon atoms, and phenoxyphenyl;

b. eluting said mixture through said matrix with a suitable solvent whereby said first and second compounds are eluted through said matrix at differential rates; and c. selectively collecting each of said first and second compounds as it is eluted from said matrix.

2. The method as described in claim 1 wherein said matrix in step (a) is agarose.

3. The method as described in claim 1 wherein said eluting solvent in step (b) is water.

* * * * *